(12) United States Patent
Saunders

(10) Patent No.: US 8,989,596 B2
(45) Date of Patent: Mar. 24, 2015

(54) MULTIPLE SENSOR OPTICAL COMMUNICATION SYSTEMS AND METHODS

(71) Applicant: Oliver W. Saunders, Los Angeles, CA (US)

(72) Inventor: Oliver W. Saunders, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 154 days.

(21) Appl. No.: 13/689,439

(22) Filed: Nov. 29, 2012

(65) Prior Publication Data

US 2013/0236171 A1 Sep. 12, 2013

Related U.S. Application Data

(63) Continuation-in-part of application No. 13/413,303, filed on Mar. 6, 2012.

(51) Int. Cl.
| | |
|---|---|
| *H04B 10/00* | (2013.01) |
| *H04B 10/07* | (2013.01) |
| *H04B 10/06* | (2006.01) |
| *H04B 10/079* | (2013.01) |
| *H04B 10/70* | (2013.01) |

(52) U.S. Cl.
CPC ...... *H04B 10/0795* (2013.01); *H04B 10/07953* (2013.01); *H04B 10/70* (2013.01)
USPC ........... 398/163; 398/140; 398/152; 398/207; 398/26; 398/27

(58) Field of Classification Search
USPC ................................ 398/140, 163
See application file for complete search history.

(56) References Cited

U.S. PATENT DOCUMENTS

| | | | | |
|---|---|---|---|---|
| 8,493,483 | B2* | 7/2013 | Nishihara | 348/294 |
| 2004/0208638 | A1* | 10/2004 | Jansen | 398/183 |
| 2005/0068217 | A1* | 3/2005 | Tsujita | 341/155 |
| 2005/0100336 | A1* | 5/2005 | Mendenhall et al. | 398/27 |
| 2005/0141660 | A1* | 6/2005 | Kim | 375/355 |
| 2005/0243952 | A1* | 11/2005 | Li | 375/343 |
| 2006/0215264 | A1* | 9/2006 | Birk et al. | 359/487 |
| 2008/0101515 | A1* | 5/2008 | Yang | 375/359 |
| 2008/0131134 | A1* | 6/2008 | Dreischer et al. | 398/128 |
| 2008/0175306 | A1* | 7/2008 | Matsuoka et al. | 375/146 |
| 2009/0196613 | A1* | 8/2009 | Linnartz | 398/78 |
| 2010/0070199 | A1* | 3/2010 | Mendenhall et al. | 702/28 |
| 2011/0133091 | A1* | 6/2011 | Frach et al. | 250/362 |
| 2011/0155899 | A1* | 6/2011 | Dror et al. | 250/252.1 |
| 2012/0281990 | A1* | 11/2012 | Caplan | 398/207 |

(Continued)

OTHER PUBLICATIONS

Cheng ["Implementation of a Coded Modulation for Deep Space Optical Communications" IEEE Globecom 2006].*

(Continued)

*Primary Examiner* — Oommen Jacob
(74) *Attorney, Agent, or Firm* — Tarolli, Sundheim, Covell & Tummino LLP

(57) ABSTRACT

An optical communication system has a receiver that includes a plurality of photon counting sensors that each receive photons and generate pulses based on the received photons, and an electronic circuit that aggregates the number of pulses from the plurality of photon counting sensors into a merged pulse count. A demodulator samples the merged pulse count at predetermined time intervals to determine a number of photons received by the plurality of photon counting sensors during different sampling time intervals.

16 Claims, 10 Drawing Sheets

(56) References Cited

U.S. PATENT DOCUMENTS

| | | | |
|---|---|---|---|
| 2013/0089339 A1* | 4/2013 | Liu et al. | 398/152 |
| 2013/0236171 A1* | 9/2013 | Saunders | 398/26 |
| 2013/0236194 A1* | 9/2013 | Saunders et al. | 398/163 |

OTHER PUBLICATIONS

Lee ["Photon Counting Techniques for the Bandlimited Optical Channel" Aerospace Conference IEEE 2005].*

International Search Report for corresponding PCT/US2013/029070 mailed Jun. 14, 2013.

Cheng et al.: *Optimizations of a Hardware Decoder for Deep-Space Optical Communications*; IEEE Transactions on Circuits and Systems; I: Regular Papers, IEEE, US, vol. 55, No. 2, Mar. 1, 2008, pp. 644-658, XP011333062, ISSN: 1549-8328, DOI: 10.1109/TCSI.2007.913733 p. 644-646.

Quirk K J et al: *Optical PPM Detection with Sample Decision Photon Counting*; Global Telecommunications Conference, 2005. Globecom '05. IEEE St. Loius, MO, USA Nov. 28-Dec. 2, 2005, Piscataway, NJ, USA, IEEE, vol. 1, Nov. 28, 2005, pp. 145-151, XP010881276, DOI: 10.1109/GLOCOM.2005.15777370, ISBN: 978-0-7803-9414-8; the whole document.

Lee et al.: *Photon Counting Techniques for the Bandlimited Optical Channel*; Aerospace Conference, 2005 IEEE, IEEE, Piscataway, NJ, USA, Mar. 5, 2005, pp. 1598-1603, XP031330435, ISBN: 978-0-7803-8870-3; the whole document.

Sun et al.: *Photon Counting with Silicon Avalanche Photodiodes*; Journal of Lightwave Technology, IEEE Service Center, New York, NY, US, vol. 10, No. 8, Aug. 1, 1992, pp. 1023-1032, XP009170220, ISSN: 0733-8724, p. 1023-1026, p. 1029-1030.

Muhammad S S et al.: *Multilevel Modulation and Channel Codes for Terrestrial FSO Links*; Wireless Communication Systems, 2005, $2^{nd}$ International Symposium on Siena, Italy Sep. 5-9, 2005, Piscataway, NJ, USA, IEEE, Piscataway, NJ, USA, Sep. 5, 2005, pp. 795-799, XP010886369, DOI: 10.1109/ISWCS.2005.1547818, ISBN: 978-0-7803-9206-09, pp. 795-796.

Yunfan Li et al.: *WLCp1-09: Transmitted Reference Schemes for Wireless Optical Communications*; Global Telecommunications Conference, 2006. Globecom '06. IEEE, IEEE, PI, Nov. 1, 2006, pp. 1-5, XP031075904, ISBN: 978-1-4244-0356-1, pp. 1-3.

* cited by examiner

MULTIPLE SENSOR OPTICAL COMMUNICATION SYSTEMS AND METHODS

RELATED APPLICATIONS

This application is a continuation-in-part of U.S. patent application Ser. No. 13/413,303, filed 2 Aug. 2012, which is incorporated herein in its entirety.

TECHNICAL FIELD

The present invention relates generally to communication, and specifically to multiple sensor optical communication systems and methods.

BACKGROUND

The current state of the art for applying known Poisson distributed emitters is to immediately convert the received signal into analog form using an optical-to-electrical (OE) conversion device (or circuit). It is then processed using Gaussian based detection rules typically associated with RF communications. The conversion to analog form introduces Gaussian noise into the signal path altering the statistical properties of the original Poisson based signal. The Gaussian approach is popular, however, because it falls back upon well-understood signal processing methodology. The advantages of using Poisson based methodology both in terms of relative simplicity of processing and expanded operating envelope have not been well understood. This is due to some extent to the difficult mathematical analysis of system performance and the lack of low cost implementations.

SUMMARY

In one aspect of the invention, an optical communication system is provided. The optical communication system includes a receiver comprising a plurality of photon counting sensors that each receive photons and generate pulses based on the received photons, and an electronic circuit that aggregates the number of pulses from the plurality of photon counting sensors into a merged pulse count. A demodulator samples the merged pulse count at predetermined time intervals to determine a number of photons received by the plurality of photon counting sensors during different sampling time intervals.

In accordance with another aspect of the invention, an optical communication system is provided that includes a transmitter and a receiver. The transmitter comprises a symbol mapper that accepts message data or waveforms and converts the message data or waveform into a symbol waveform, an emitter configured to transmit light pulses to a receiver, and a modulator that controls the output of light pulse energy from the emitter based on the symbol waveform. The receiver comprises a plurality of photon counting sensors that each receive photons and generate pulses based on the received photons, an electronic circuit that aggregates the number of pulses from the plurality of photon counting sensors into a merged pulse count, and a demodulator that samples the merged pulse count at predetermined time intervals to determine a number of photons received by the plurality of photon counting sensors during different sampling time intervals.

In yet another aspect of the invention, a method is provided for communicating in an optical communication system. The method comprises receiving light energy at a plurality of photon counting sensors, and aggregating the number of pulses generated by the plurality of photon counting sensors into a merged pulse count. The method further comprises sampling the merged pulse count at predetermined time intervals to determine a number of photons received by the plurality of photon counting sensors during different sampling time intervals, and determining and assigning an on-state when a merged pulse count associated with a given time interval exceeds a predetermined threshold indicating the receipt of transmitted light pulse energy and assigning an off-state to a given time interval of the plurality of intervals indicating no receipt of transmitted light pulse energy.

DETAILED DESCRIPTION

The present invention relates generally to Poisson-based optical communication systems and methods. One aspect of the invention is to utilize a time sampled event counter to capture the numbers of Poisson distributed events (i.e., intensity, number of photons) received by a photon counting sensor in a sample interval directly rather than approximating them with analog voltages. This is somewhat similar to the use of an A/D converter which samples a continuous analog process and outputs a digital word corresponding to the input level. In this case, the number of events over a sampling interval is counted. Successive count data outputs then generate a time history of the received process. All counts are exact and do not have any equivalent of the errors associated with A/D conversion (e.g., sample and hold errors and quantization noise).

The present invention enables efficient use of Poisson based emitters in communications applications and exploit their unique statistical properties in order to achieve effective operation over a wide range of operational environments that would otherwise be impractical. Although the most general application for this invention would be to carry data in digital form, it is also easily adapted to carrying analog (non-digitized) signals. The present invention introduces an architecture that introduces new components and processing concepts that allow these systems to exploit the unique properties of Poisson processes to enable operation in both very low signal environments and in the presence of high background noise levels. This methodology can be adapted both to high cost, ultra-high performance systems and mass produced, low cost systems with modest performance.

In another aspect of the invention, a plurality of photon counting sensors are employed to synthesize a receiving array used as the front end of an optical communications receiver thereby improving its bit error rate (ber) performance relative to a single photon counting sensor system. An electronic circuit merges pulse streams from the photon counting sensors and then counts these pulses over a receiver controlled time interval and/or arithmetically sums the count values from the photon counting sensor that have their own integrated counter. The plurality of photon counting sensors can be mounted on a common surface and in proximity to each other with no required pattern to their placement but aligned to point in the same direction and whose pulse outputs are counted using either or both of the techniques described above.

Figure 1:
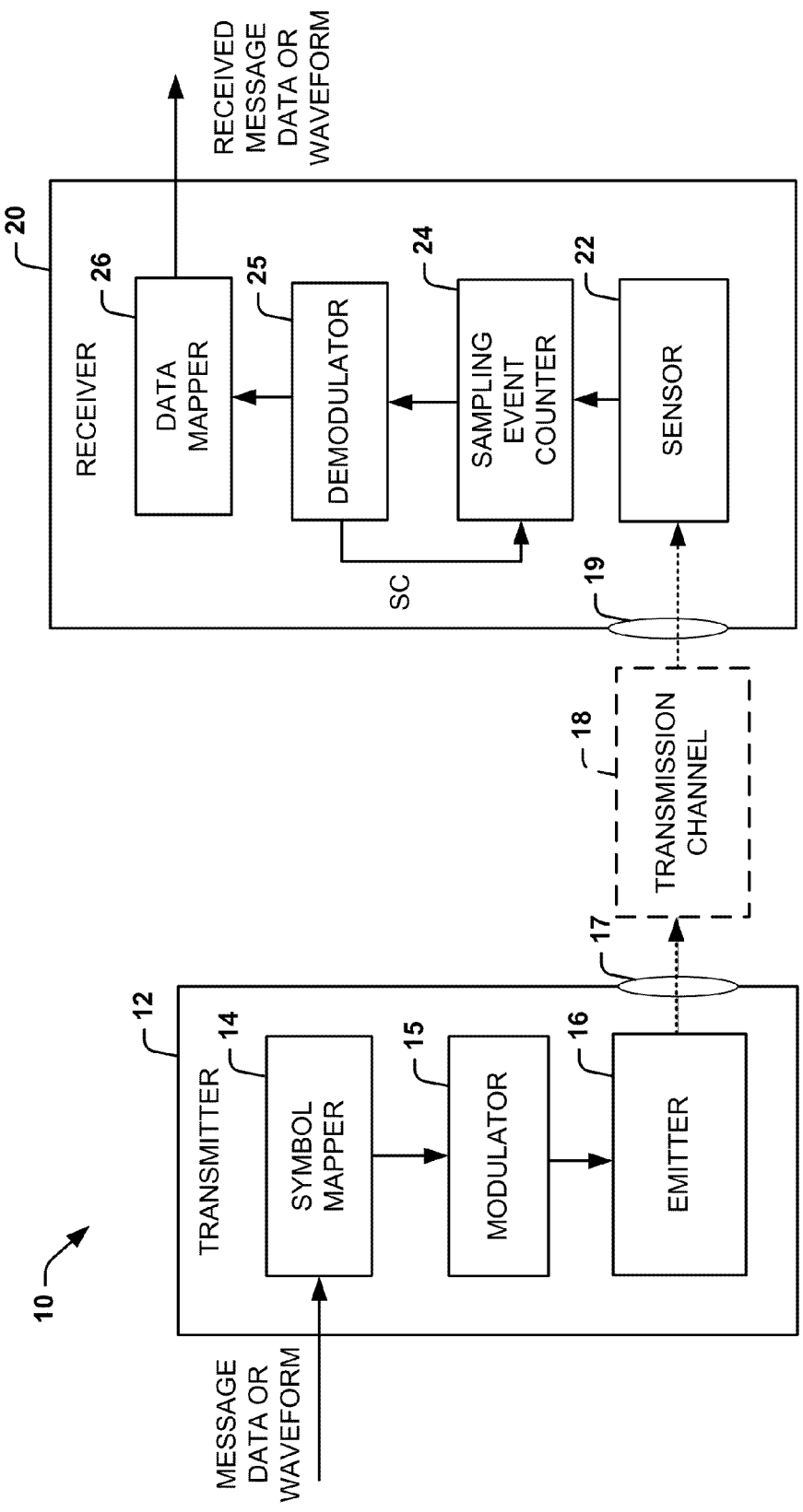
FIG. 1 illustrates an optical communication system in accordance with an aspect of the present invention.

FIG. 1 illustrates an optical communication system 10 in accordance with an aspect of the present invention. The optical communication system 10 includes a transmitter 12 and a receiver 20. The transmitter 12 includes a symbol mapper 14 that accepts message data or waveforms and converts the message data or waveform into a symbol waveform format (e.g., on-off keyed (OOK) format, pulse position modulation (PPM) format). The symbol waveform is provided to a modulator 15 that controls the output of light pulse energy (e.g., photons) from an emitter 16 through transmitting optics 17 based on the symbol waveform (e.g., on-off-state of symbol waveform). The light pulse energy is then transported through a physical transmission channel 18, such as free space or underwater to the receiver 20. The receiver 20 includes a photon counting sensor 22 that receives the light pulse energy in the form of photons through receiving optics 19. The photon counting sensor 22 outputs a pulse for each received photon (referred to as, each Poisson distributed event) which is counted by a sampling event counter 24.

A demodulator 25 can sample the sampling event counter 24 to determine the count in the sampling event counter 24 that corresponds to the number of Poisson distributed events or photons detected by the photon counting sensor 22. The demodulator 25 includes a control component such as a controller to control the sampling times via a sampling control (SC) signal to the sampling event counter 24. In this manner, the demodulator 25 tunes the sampling to optimize the detection of whether or not output pulses have been transmitted by the emitter 16 and energy that includes the transmitted pulses has been received by the photon counting sensor 22. The on and off transmission, reception and counting provides for the ability to provide for symbol code formatting (e.g., on-off keying) of the message data or waveform sent by the transmitter 12, which can be decoded by the demodulator 25, as will be discussed further below.

The demodulator 25 then provides the decoded symbols to a data mapper 26 for mapping of the decoded symbols into the received message data or waveform received by the receiver 20. The demodulator 25 reads the sampling event counter 24 at predetermined intervals to determine if output pulses from the transmitter 12 have been received by the photon counting sensor 22. The demodulator 25 can reset the sampling event counter 24 after each read, or subtract out the previous value of the counter to determine a count value of the sampling event counter 24 associated with the predetermined interval. It is to be appreciated that a variety of other components, such as interface components, timing and power components will be employed by the transmitter 12 and the receiver 20.

In accordance with an aspect of the present invention, waveforms and associated demodulation techniques have been tailored to exploit the unique properties of Poisson process as follows:

1) sample values of a Poisson process are non-negative integers (0 is a valid outcome)

2) the mean value and variance of a Poisson process are identical 3) the standard deviation of a Poisson process is equal to the square root of its mean 4) mean values of distributions add directly: Pois(a)+Pois(b)=Pois(a+b) where a and b are the mean values of the summed Poisson processes.

This last property defines a situation in which signal rides on noise instead of blending into it as with Gaussian noise.

One of the unique properties of the Poisson function is that the shape of its probability distribution function changes with its mean value. For this reason, the use of normalized signal-to-noise (SNR) metrics such as SNR or energy/bit-to-noise (Eb/No) power density cannot be used as the independent variable when computing bit error rate or the fidelity of a received analog signal. Instead, each actual operating point as defined by the mean signal rate and the mean noise rate (denoted as OP(S,N)) needs to be used in these computations.

In an aspect of the invention, each symbol is received by the demodulator 25 in the form of multiple count values from the sampling event counter 24 that have been synchronized to the received symbol waveform. A symbol waveform can represent one or more message bits. The demodulator 25 computes a matched filter response from these count values to optimize the symbol decision process. The shape of its response provides feedback to the sampling event counter 24 to synchronize the sampling of the sampling event counter 24 to the incoming signal waveform, so that the matched filter extracts maximum signal energy counts from the sampling event counter 24. In accordance with an aspect of the present invention, symbol formats can be formed employing a return to zero (RZ) waveform to provide an OOK (on-off keyed) signal for transmitting and receiving message data or waveforms. The RZ waveform (also known as Manchester coded) can employed as a basis for a simple but highly effective transmission scheme. Alternatively, symbol formats can be formed employing a non-return to zero (NRZ) waveform for transmitting and receiving message data or waveforms, or a pulse position modulation (PPM) format.

Figure 2:
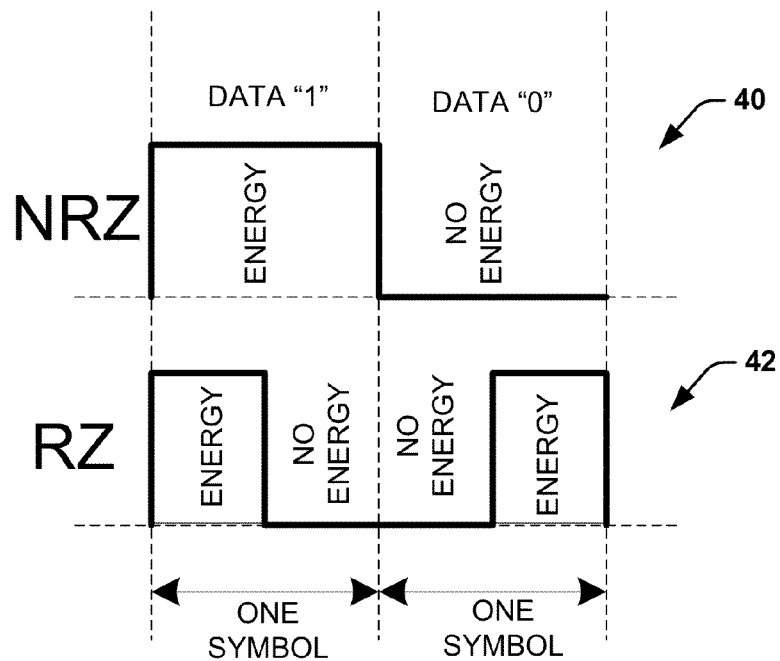
FIG. 2 illustrates a RZ symbol waveform along with an NRZ symbol waveform for providing symbol formats in accordance aspects of the present invention.

FIG. 2 illustrates an RZ symbol waveform 42 along with an NRZ symbol waveform 40 for providing symbol formats in accordance with aspects of the present invention. As illustrated in FIG. 2 with respect to the NRZ symbol format 40, a first logic state (e.g., logic "1" state) can be provided by transmitting energy (on-state) over a predetermined time period, while a second logic state (e.g., logic "0" state) can be provided by not transmitting energy (off-state) over a predetermined time period. As illustrated in FIG. 2 with respect to the RZ symbol format 40, a first logic state (e.g., logic "1" state) can be provided by transmitting energy (on-state) over a first time interval of a predetermined time period followed by not transmitting energy (off-state) over a second time interval of the predetermined period, and a second logic state (e.g., logic "0" state) can be provided by not transmitting energy (off-state) over a first time interval of a predetermined time period followed by transmitting energy (on-state) over a second time interval of the predetermined time period.

For purposes of the present invention, the RZ symbol format has a number of distinct advantages over the NRZ symbol format, such as a fixed 50% duty cycle, self clocking (there is at least one transition in every symbol), and self thresholding (energy and no-energy states occur in every symbol). Although the following examples will be illustrated with respect to the RZ symbol format, it is to be appreciated other embodiments of the present invention could employ the NRZ symbol format, or other symbol formats (e.g., higher order symbol formats).

Referring again to FIG. 1, counts are made during each half of the RZ symbol received at the photon counting sensor 22. One half of the RZ symbol will include counts generated by the received optical energy summed with the internal noise counts generated by the detector. The mean value will be S+N. The other half of the RZ symbol will have counts from the detector noise alone with its mean value being N. The relationship is shown for one RZ symbol in the waveform 50 in FIG. 3. The demodulator 25 can check the counts with a predetermined count value to determine if the half of the RZ symbol is in the on-state or off-state.

Figure 3:
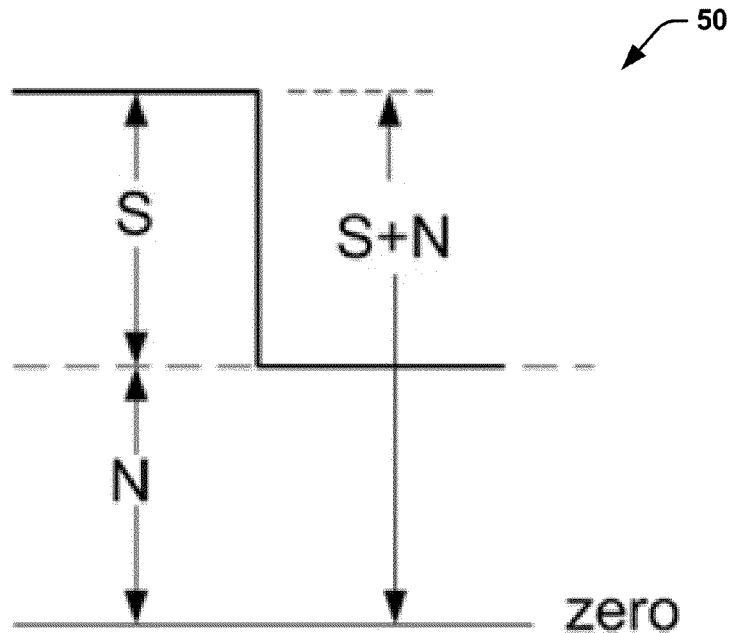
FIG. 3 illustrates a mean value count waveform representatoin of an RZ symbol in accordance with an aspect of the present invention.

In accordance with one aspect of the invention, bit decisions use the following simple rule: compare the number of counts in the first half and second half of the symbol; if the first half is larger, the symbol is declared to be a first logic state (e.g., logic "1"), and if the second half is equal or larger, the symbol is declared to be a second logic state (e.g., logic "0"). For example, when a logic "1" is sent, the counts in the first half will have a mean value equal to the sum of means of the received signal and of the detector noise generated during that time interval of a given time period; and the counts in the second half will have a mean value equal to that of the detector noise alone in the second time interval of the given time period. As shown in FIG. 3, Pois(S+N) denotes the Poisson process during the signal half of the symbol and Pois(N) denotes the Poisson process during the noise only half. It is to be appreciated that the logic states can be reversed such that a logic "1" is based on energy being received in the second half of the symbol and a logic "0" being based on energy being received in the first half of the symbol.

Figure 4:
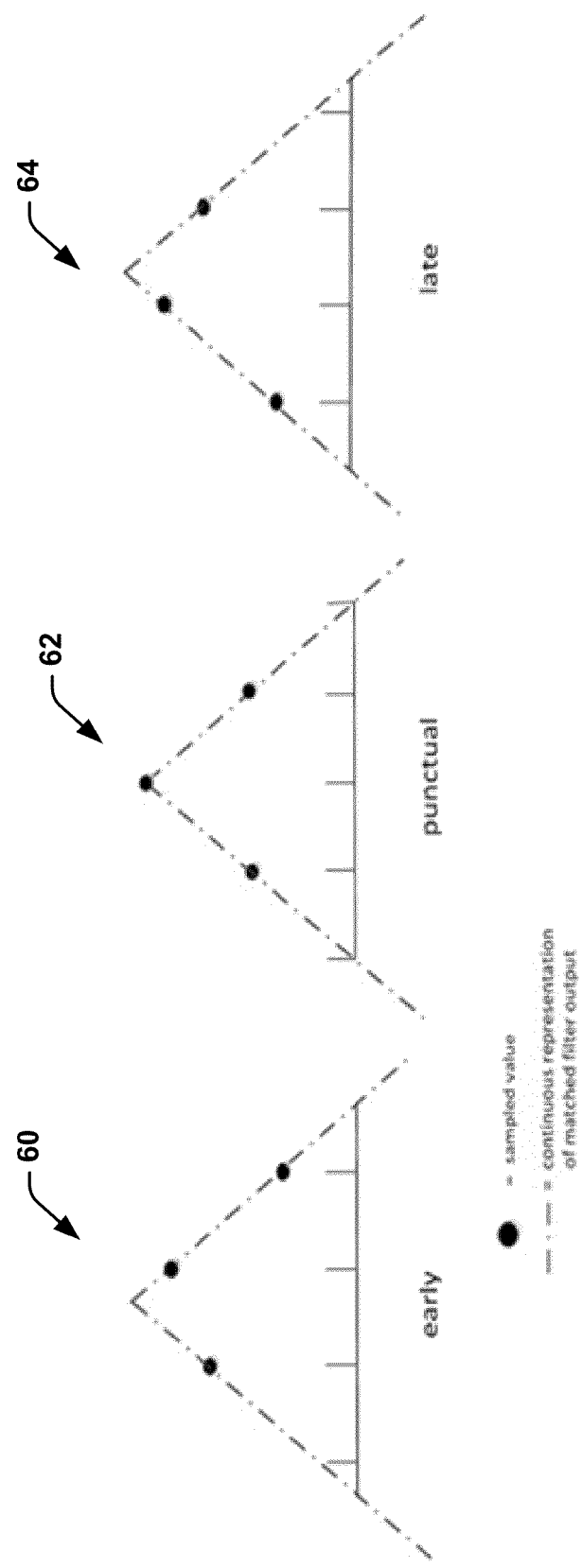
FIG. 4 illustrates a set of exemplary matched filter output waveforms.

Timing errors between the sampling process and the incoming waveform are estimated by measuring the symmetry of a matched filter's output waveform residing in the demodulator 25. FIG. 4 illustrates a set of exemplary matched filter output waveforms. A desired alignment results in a time symmetric output as illustrated in a punctual matched filter output waveform 62. Asymmetry denotes that the sampling is either "early" as illustated in early matched filter output waveform 60, or "late" as illustrated in late matched filter output waveform 64. The amount of relative asymmetry provides an estimate of the extent of the error. Timing error estimates form the basis of a correction signal that is fed back to the sample timing generator, such as a Digital Direct Synthesizer. Small timing errors do not significantly degrade performance and so it is not necessary to continually eliminate the timing error completely. For this reason, the estimation/correction process does not have to run continuously but rather at user defined intervals (e.g. several time per second). The error signal is generally noisy and filtering is applied to smooth the estimate before it is used as a correction.

Figure 5:
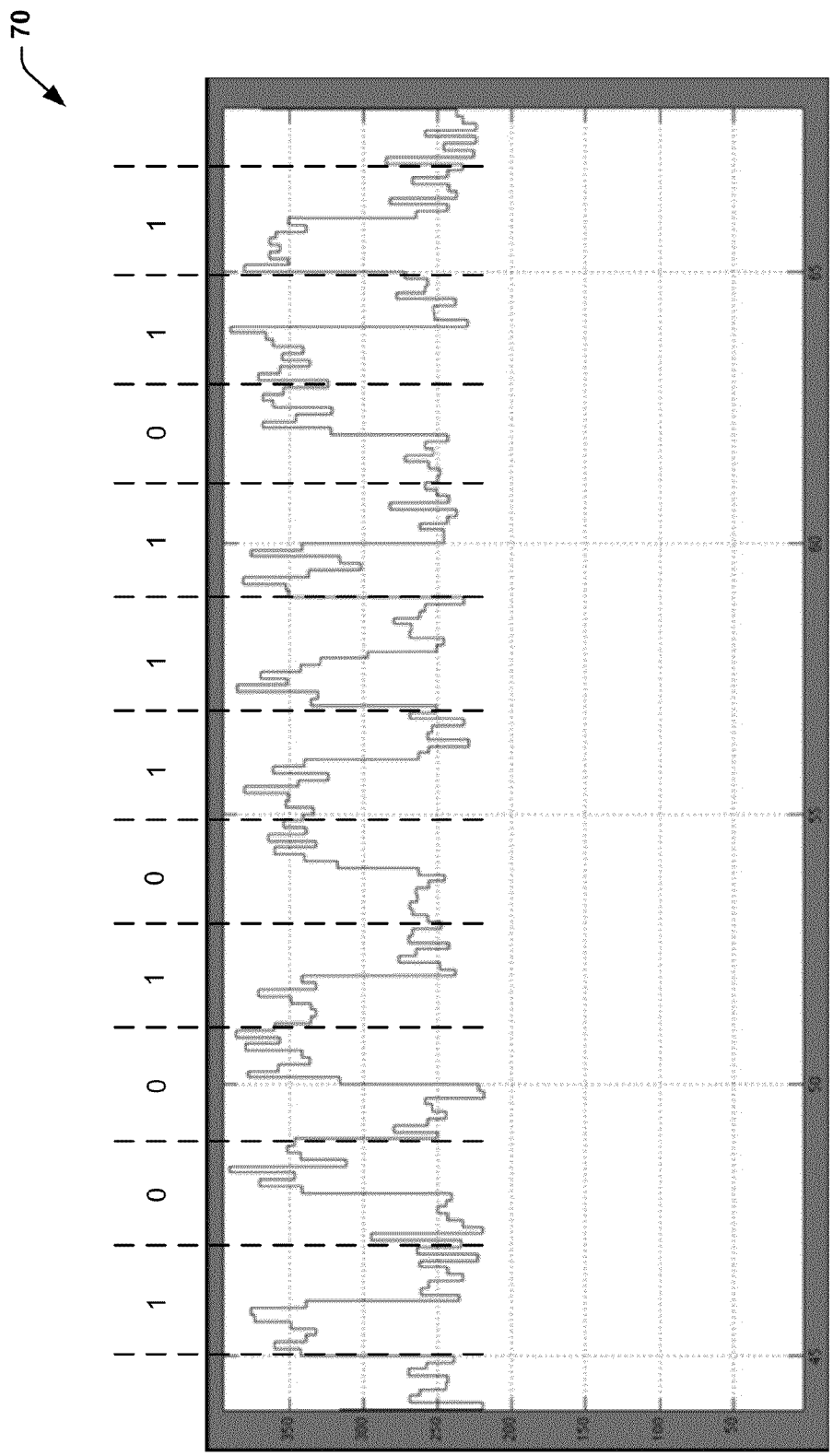
FIG. 5 illustrates a RZ symbol waveform in accordance with an aspect of the present invention.

FIG. 5 illustrates a RZ symbol waveform 70 in accordance with an aspect of the present invention. The RZ symbol waveform 70 has a mean arrival rate of 100 counts/sec in the presence of background noise having a mean arrival rate of 250 counts/sec. With proper signal waveform design and detection processing, signals can readily be extracted from background noise permitting effective operation under conditions that would otherwise be impractical. As illustrated in FIG. 5, the RZ symbol waveform 70 includes a sequence of symbols that form a binary pattern of logic "1"s and "0"s (i.e., "10010111011"). As shown, symbols with logic "1"s includes signal energy and noise over a first time interval followed by no signal energy with only noise over a second time interval. Symbol's with logic "0"s include no signal energy with only noise over a first time interval followed by signal energy and noise over the second time interval. It is to be appreciated that noise includes noise from not only the photon counting sensor and other components of the communication system, but also light from other sources besides the transmitter.

Figure 6:
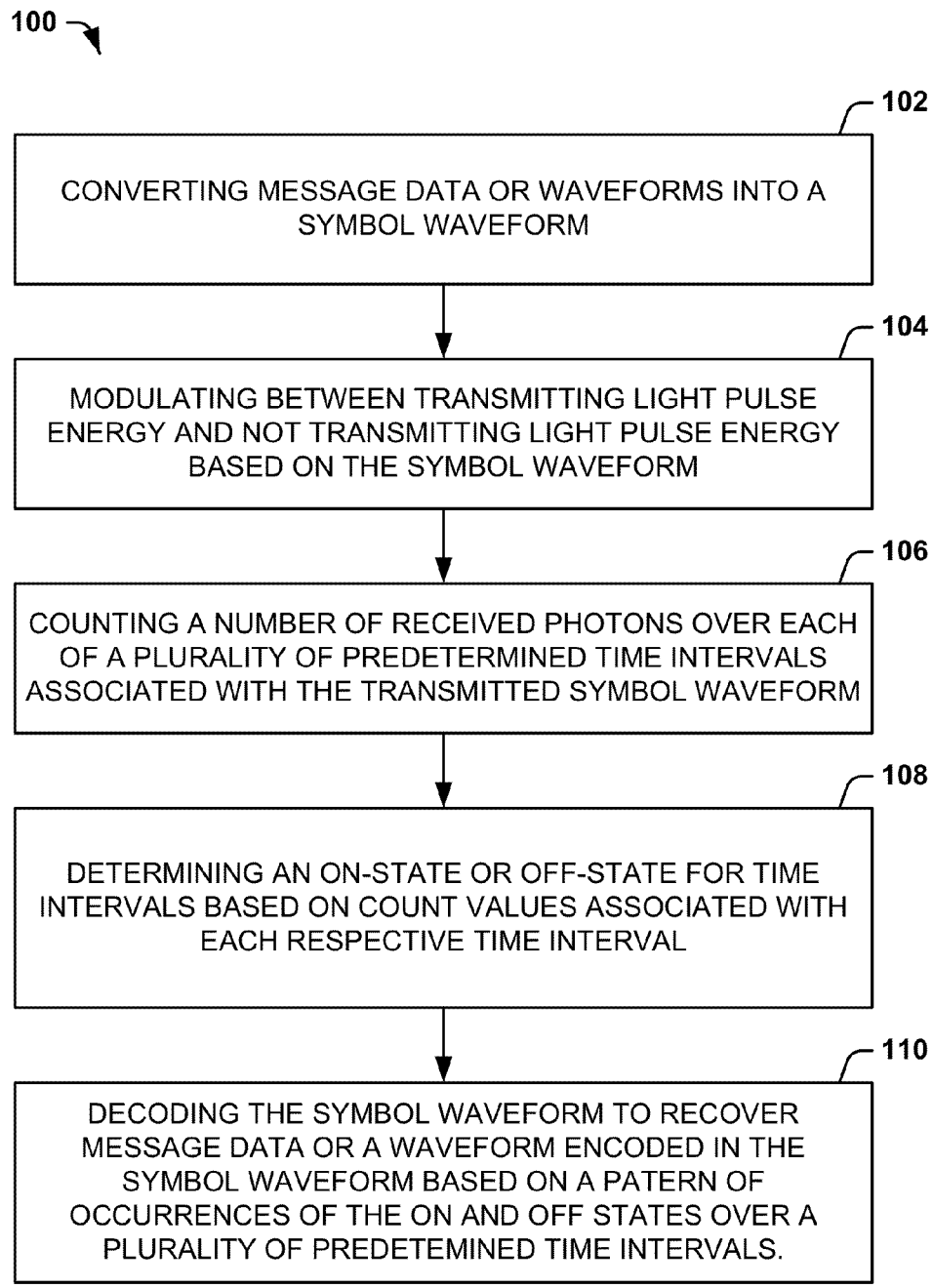
FIG. 6 illustrates an example of a method for communicating in an optical communication system in accordance with an aspect of the invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 100 for communicating in an optical communication system in accordance with an aspect of the invention. The method 100 begins at 102, where message data or waveforms are converted into a symbol waveform. The symbol waveform can include one or more symbols. The symbol waveform can conform to an on-off keyed format, such as, for example, an RZ format or an NRZ format. AT 104, the transmitting of light pulse energy is modulated between transmitting light pulse energy and not transmitting light pulse energy based on the symbol waveform. The methodology 100 then proceeds to 106. At 106, a number of received photons associated with the transmitted symbol waveform are counted over each of a plurality of predetermined count intervals. At 108, an on-state or off-state is determined for each time interval based on the count values associated with each respective time interval. At 110, the symbol waveform is decoded to recover the message data or waveform encoded in the symbol waveform based on a pattern of occurrences of the on-state and off-states over the plurality of predetermined intervals.

For example, a given logic state can be determined based on whether a time interval within a time period had been determined to be in an on-state followed by a time interval in an off-state (e.g., logic "1"), or based on whether a time interval within a time period had been determined to be in an off-state followed by a time interval in an on-state (e.g., logic "0") (i.e., RZ format). Alternatively, an on-state can be determined when a count value exceeds a predetermined threshold and an off-state can be determined when a count value is at or below the predetermined threshold. A given logic state can then can be determined based on whether a time period had been determined to be in an on-state (e.g., logic "1") or in an off-state (e.g., logic "0") (i.e., NRZ format). Furthermore, logic states can be determined based on whether or not a count value is greater than or less than a count value of a subsequent time interval. It is to be appreciated that a variety of symbol formats and decoding techniques can be employed to carry out the present invention.

In accordance with another aspect of the present invention, multiple photon counting sensors are employed in a receiver to increase the effective area available for photon collection thereby increasing the number of photons actually collected for a Poisson based communication system and method. This approach combines the pulses or synchronized counts of pulse activity from multiple sensors and performs demodulation on the composite stream of pulse counts.

Figure 7:
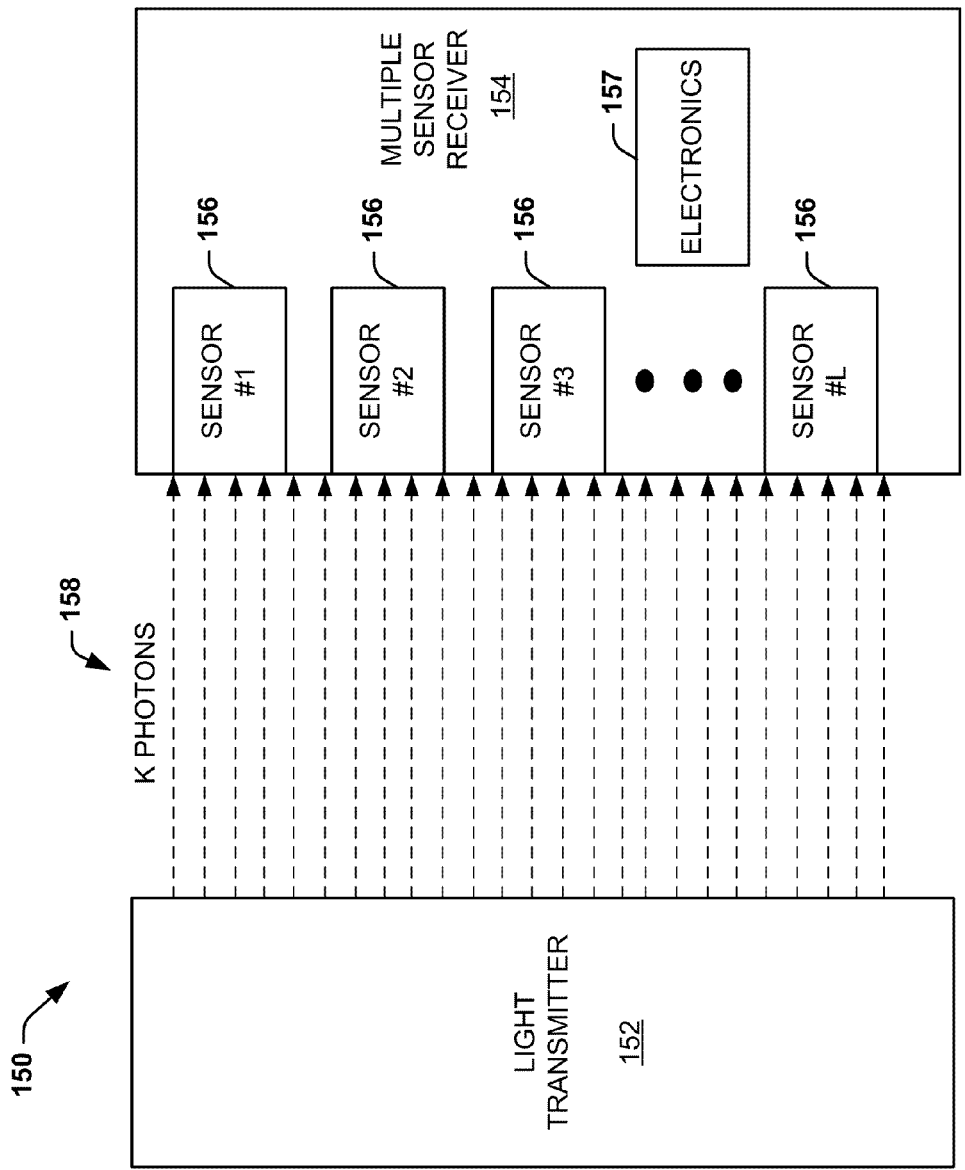
FIG. 7 illustrates a multiple sensor optical communication system in accordance with an aspect of the present invention.

FIG. 7 illustrates a multiple sensor optical communication system 150 in accordance with an aspect of the present invention. The multiple sensor optical communication system 150 includes a single optical transmitter 152 and a multiple sensor receiver 154. The single optical transmitter 152 can be similar to the transmitter 12 of FIG. 1. The single optical transmitter 152 transmits K light photons 158 where K is an integer greater than one, to the multiple sensor receiver 154. The K light photons 158 can be transmitted or not transmitted based on a modulated symbol waveform to be transmitted. Alternatively, various numbers of the K light photons 158 can be transmitted or not transmitted to provide a plurality of different photon counting states based on a desired modulation scheme. The multiple sensor receiver 154 includes L photon counting sensors 156 placed along an end of the receiver 154 for receiving and counting photons from the K light photons 158, where L is an integer greater than one. The L photon counting sensors 156 can be arranged in a variety of configurations (e.g., circular, linear, rectangular, etc.).

The multiple sensor receiver includes electronics 157 (e.g., electronic circuit) that aggregate the output electrical photon counting signals (or actual photon counts) from the L photon counting sensors 156 and produce a single composite stream of photon count information that is used to demodulate the corresponding transmitted symbol waveform. The purpose of the utilization of multiple photon counting sensors is to improve the performance of a photon counting optical receiver at its input optical front end.

This multiple photon counting sensor receiver can be used in several ways to replace a single expensive, high performance sensor with a sensor array constructed from cheaper, lower performance sensors, to replace a single sensor whose performance has been enhanced through the use of an external reflector or lens, to implement a physically distributed optical sensor array that can conform to unusual mounting surfaces, or to implement a high performance sensor array with performance that exceeds the capabilities achievable with a single enhanced sensor. In addition, there is no requirement to utilize identical sensors. Furthermore, the merged pulse counts from individual groups of sensors can also be combined arithmetically as long as they use a common sampling control signal.

The bit error rate (ber) performance of a Poisson based (e.g. optical photon counting) communications system can be dependent upon the performance (effective area and efficiency) of its collection sensor. Link budget analysis provides good estimates of the density of photons (photons/$cm^2$) expected to arrive at the receiving end of the link. The receiving sensor itself has an effective capture area ($cm^2$) such that the maximum number of photons it collects is the product of the photon density and the effective capture area. When the capture area of the receiving sensor is too small to provide the number of photons/bit required to achieve the desired performance, optical techniques such as a reflector or lens are often commonly used to increase the sensor's effective capture area. These techniques require that precise alignment be established and maintained between the reflector or the lens and the sensor. It also considerably increases the volume of the detection unit.

This multiple sensor optical communication system of the present invention describes a technique to interconnect multiple individual photon counting sensors together to improve the overall performance of the receiving front end without a reflector or lens. It is highly flexible and adaptable technique that exploits the unique statistical properties of Poisson processes when applied to communications. Sensor placement relative to each other is not dictated by optical concerns and they can be configured as groups on panels sized to fit specific applications or placed individually to conform to irregular surfaces.

Figure 8:
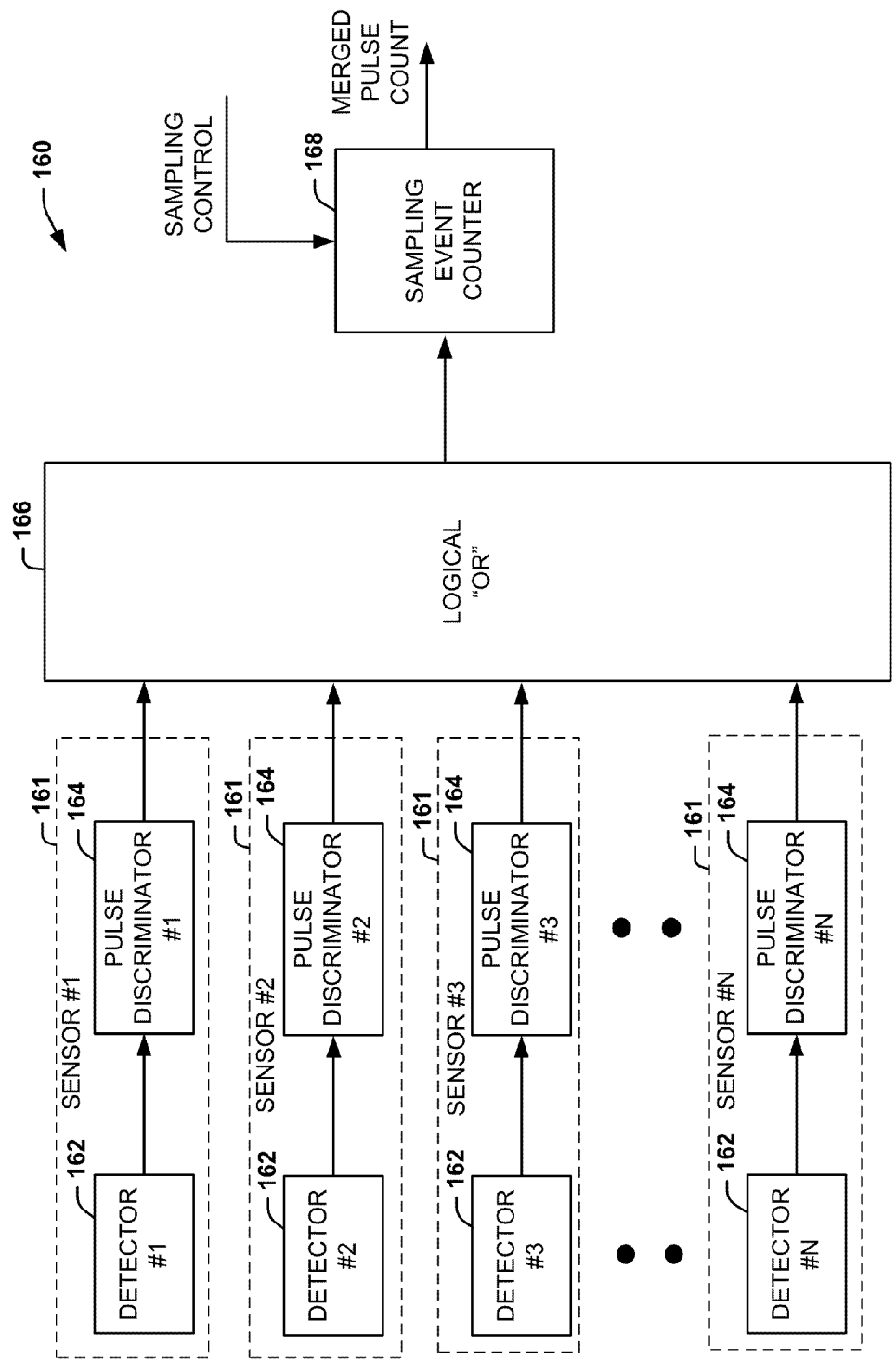
FIG. 8 illustrates a multiple sensor receiver in accordance with one aspect of the present invention.

FIG. 8 illustrates a multiple sensor receiver 160 in accordance with one aspect of the present invention. The multiple sensor receiver 160 includes a plurality of photon counting sensors 161 labeled, #1-#N, where N is an integer greater than one. Each of the photon counting sensors 161 includes a photodector 162 and a pulse discriminator 164 that determines whether or not a photon has been received by the photodetector 162 and generates a pulse output in response to a received photon. A logical "OR" logic device 166 comprised of a plurality of logic gates receives each pulse output from each of the plurality of photon counting sensors 161 and provides the pulse outputs to an output coupled to a sampling event counter 168. The sampling event counter 168 counts the received pulse outputs in a same manner as described with respect to FIG. 1. The pulse count is sampled via a sampling control signal to provide a merged pulse count based on a predetermined timing interval to a demodulator (not shown) to determine, for example, whether or not the merged pulse count indicates that a light pulse is being transmitted or a light pulse is not being transmitted.

Figure 9:
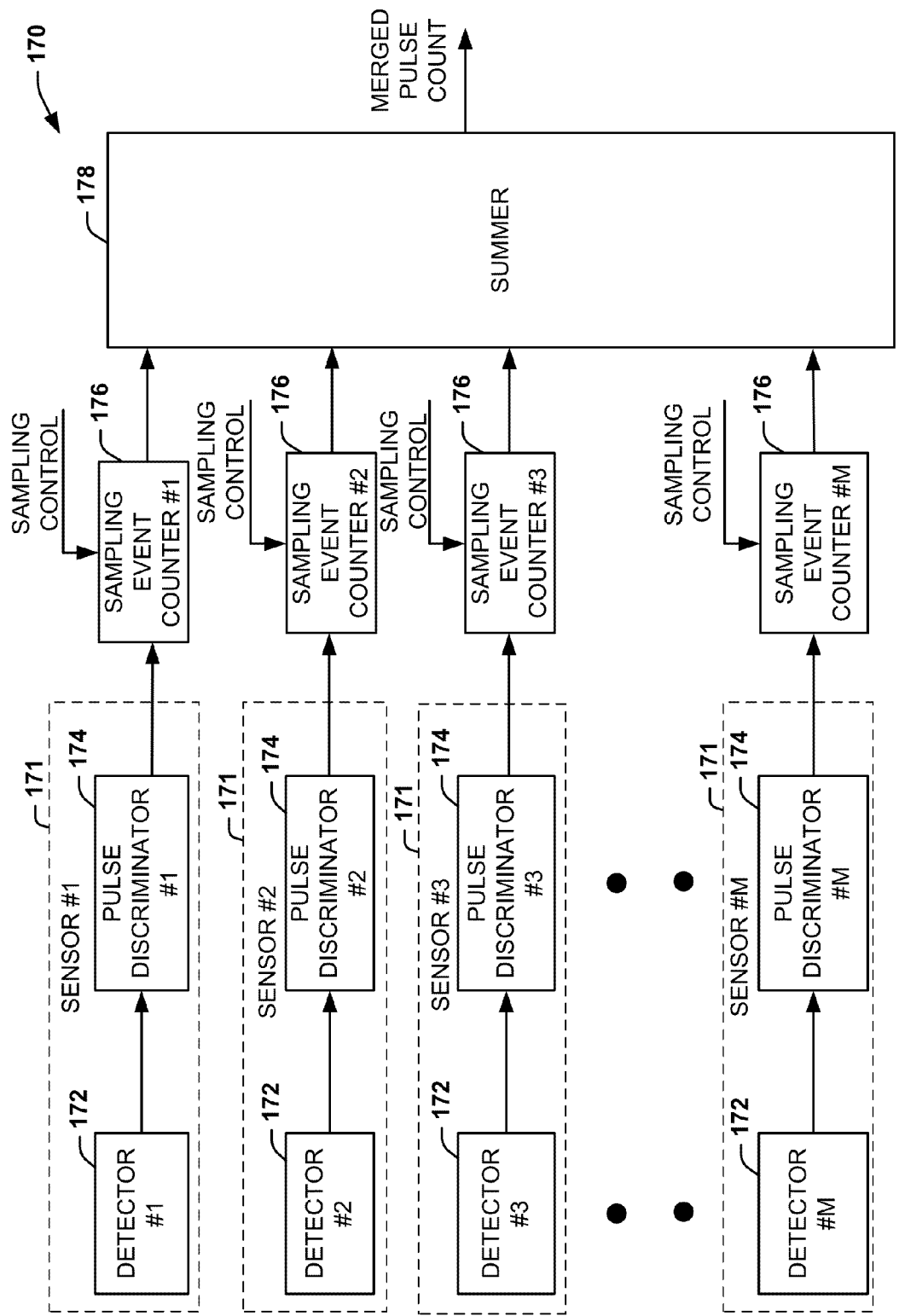
FIG. 9 illustrates a multiple sensor receiver in accordance with another aspect of the present invention.

FIG. 9 illustrates a multiple sensor receiver 170 in accordance with another aspect of the present invention. The multiple sensor receiver 170 includes a plurality of photon counting sensors 171 labeled, #1-#M, where M is an integer greater than one. Each of the photon counting sensors 170 includes a photodector 172 and a pulse discriminator 174 that determines whether or not a photon has been received by the photodetector 172 and generates a pulse output in response to a received photon. Each of the photon counting sensors 171 has a corresponding sampling event counter 176 also labeled, #1-#M. Each sampling even counter 176 counts the received pulse outputs for its corresponding photon counting sensor 171 in a same manner as described with respect to FIG. 1. A pulse count for each of the sampling event counters 176 are sampled via a common sampling control signal at a predetermined time interval, and provided to a summer 178. The summer 178 provides a merged pulse count based on the predetermined timing interval to determine whether or not the merged pulse count indicates, for example, that a light pulse is being transmitted or a light pulse is not being transmitted.

It is to be appreciated that the components of the multiple sensor receiver 160 of FIG. 8 and the components of the multiple sensor receiver of FIG. 9 can be combined in accordance with various aspect of the present invention. For example, the multiple sensor receiver 160 of FIG. 8 can serve as a single input stage for a plurality of input stages to the summer 178 replacing a given sensor 171 and sampling event counter 176 of FIG. 9. Alternatively, the sensors 161 and logical "OR" gate 166 of the multiple sensor receiver 160 of FIG. 8 can serve as a single input stage for a plurality of input stages to respective sampling event counters 176 of FIG. 9.

This combining of pulse counts results in an improved operating point with respect to signal, S, and noise, N, that results in improved bit error rate (ber) performance. An obscure statistical function, the Skellam distribution, can be used to compute exact ber for specific values of S+N and N. For these arguments, the mean value of this difference is S=(S+N−N) and the variance is S+2N (=S+N+N). The ber value is given by the Skellam distribution's cdf for value 0 (minus a small correction factor). The ber values for a wide range of operating points can be estimated using a Gaussian approximation for the Skellam function. In this approximation, Sk(S+N, N) N(S, S+2N), where N is the normal probability distribution function with mean (S) and variance (S+2N). This approximation is an upper bound (worst case estimate) of ber performance and can be high by as much as 50% but this degree of error is usually acceptable when dealing with ber values that are generally specified in orders of magnitude, e.g. 1^(−8). The approximation uses the normal distribution's cdf for value 0. This function is known as the "error function (erf)" and in this particular case its complement (1−erf=erfc) is used such that now the ber can be approximated by: ber≈0.5*erfc[X/√(2)] where erfc( ) is complementary error function and, $X=[S/(\sqrt{(S+2N)})]$.

Figure 10:
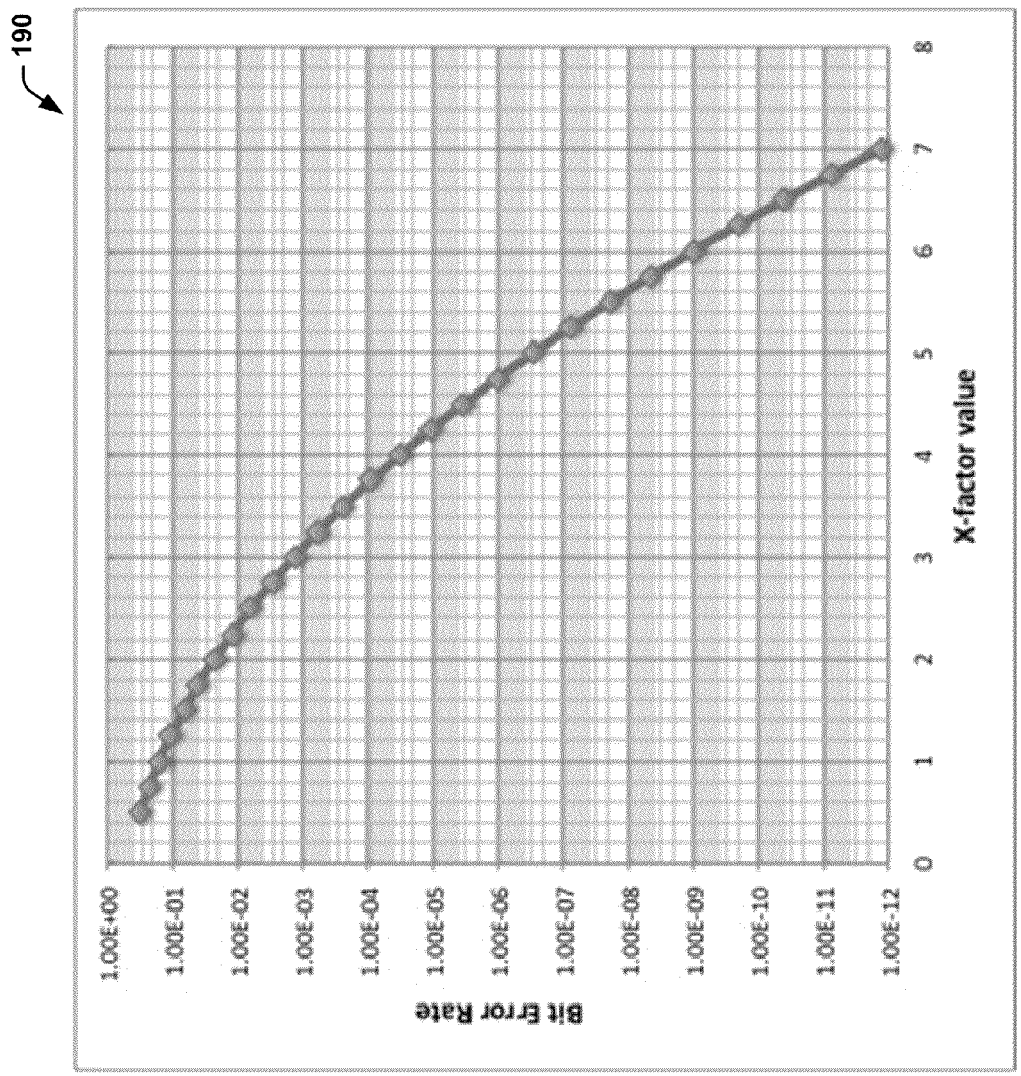
FIG. 10 illustrates a plot of bit error rate (ber) vs X (the X-factor).

FIG. 10 is a plot 190 of ber vs X (the X-factor). X is a non-linear function of S and N. For this reason, the generalities (and rules of thumb) commonly used with the Gaussian Signal-to-Noise Ratio, S/N do not apply and should be avoided since each combination of S and N has its associated X-factor. A single sensor in a group of identical sensors might hypothetically produce a value of 50 for S+N and a value of 30 for N (with then a derived value for S of 20). The corresponding X-factor would be 20/√(20+2*30)=20/√(80)=2.236 which corresponds to a ber of 1.27E-02. Summing the photon counts from two sensors produces an X-factor of 3.162 with a ber of 7.83E-04.

Table 1 presents the improvement as more sensor counts are combined to the aggregate. The improvement relative to a single sensor goes as the square root of the number of sensors.

TABLE 1

Typical array performance improvements

| No. of sensors | S + N\|total | N\|total | S\|total | X-factor | Bit error rate |
|---|---|---|---|---|---|
| 1 | 50 | 30 | 20 | 2.236 | 1.27E−02 |
| 2 | 100 | 60 | 40 | 3.162 | 7.83E−04 |
| 3 | 150 | 90 | 60 | 3.873 | 5.38E−05 |
| 4 | 200 | 120 | 80 | 4.472 | 3.87E−06 |
| 5 | 250 | 150 | 100 | 5.000 | 2.87E−07 |
| 6 | 300 | 200 | 120 | 5.477 | 2.16E−08 |
| 7 | 350 | 250 | 140 | 5.916 | 1.65E−09 |

While the assumption of identical sensors was made for purposes of an easy example, there is no restriction that all sensors be identical. In its most general form:

$$S+N|total=(S+N)1+(S+N)2\ldots+(S+N)n \text{ and}$$
$$N|total=N1+N2\ldots Nn.$$

Figure 11:
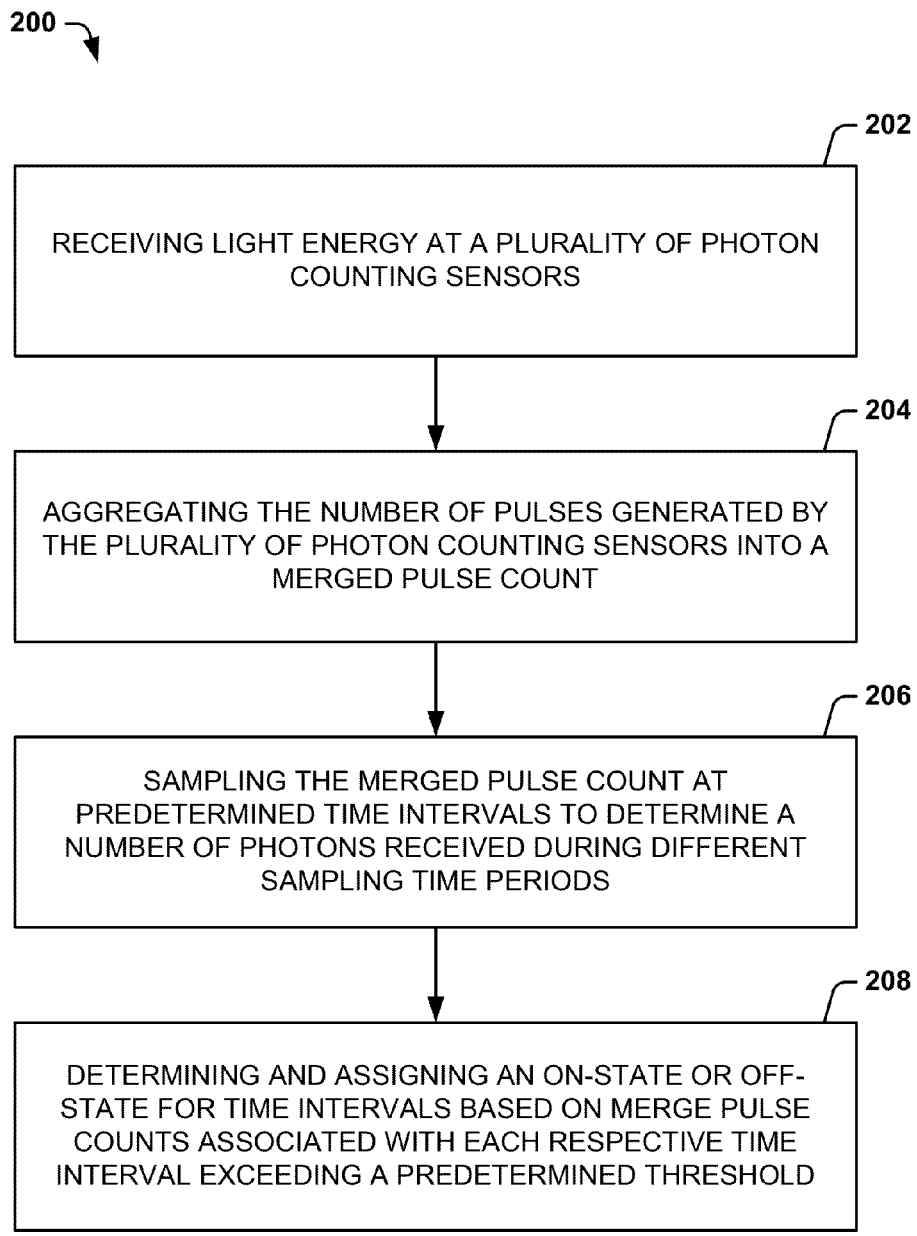
FIG. 11 illustrates an example of another method for provided for communicating in an optical communication system.

In view of the foregoing structural and functional features described above, a methodology in accordance with various aspects of the present invention will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 11 illustrates an example of another method 200 for provided for communicating in an optical communication system. The method 200 begins at 202 where light energy is received at a plurality of photon counting sensors. The light energy can be based on light pulse energy from a transmitter and/or noise. At 204, the number of pulses generated by the plurality of photon counting sensors are aggregated into a merged pulse count. At 206, the merged pulse count is sampled at predetermined time intervals to determine a number of photons received by the plurality of photon counting sensors during different sampling time intervals. At 208, an on-state or off-state is determined and assigned for time intervals based on merged pulse counts associated with each respective time interval exceeding a predetermined threshold. For example, an on-state is assigned when light pulse energy plus noise causes the merged pulse count to exceed the predetermined threshold, while an off-state is assigned when noise causes the merge pulse count to fall below the predetermined threshold.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An optical communication system comprising:
   a receiver comprising:
   a plurality of photon counting sensors that each receive photons and generate pulses based on the received photons;
   an electronic circuit that aggregates the number of pulses from the plurality of photon counting sensors into a merged pulse count; and
   a demodulator configured to:
      sample the merged pulse count at predetermined time intervals to determine a number of photons received by the plurality of photon counting sensors during different sampling time intervals;
      determine, for each sampling time interval, an occurrence of a first state when light pulse energy has been transmitted by a transmitter and received by the plurality of photon counting sensors and an occurrence of a second state when light pulse energy has not been transmitted by the transmitter and received by the plurality of photon counting sensors;
      decode a symbol waveform to recover message data or a waveform encoded in the symbol waveform that is based on a pattern of the occurrences of the first and second states over a plurality of predetermined time intervals, wherein the symbol waveform is based on a return to zero (RZ) format; and
      compute a matched filter response from count values corresponding to the number of photons received by the plurality of photon sensors and use the shape of this response to provide feedback to one or more sampling event counters of the electronic circuit to synchronize a sampling of the one or more sampling event counters of the electronic circuit to an incoming symbol waveform corresponding to a pattern of occurrences of the first and second states to maximize received signal energy counts from the one or more sampling event counters of the electronic circuit.

2. The system of claim 1, wherein the electronic circuit comprises:
   a logical "OR" logic device that receives the pulses from each of the plurality of photon counting sensors and provides each of the received pulses at an output; and
   the one or more sampling event counters that counts the number of generated pulses provided at the output of the logical "OR" device and provides a merged pulse count in response to a sampling control signal.

3. The system of claim 1, wherein the one or more sampling event counters is a plurality of sampling event counters and the electronic circuit comprises:
the plurality of sampling event counters, with each of the photon counting sensors having a respective sampling event counter that counts the number of generated pulses of its corresponding photon counting sensor; and
a summer that sums the count values that are provided from the plurality of sampling event counters in response to a common sampling control signal to provide a merged pulse count.

4. The system of claim 1, wherein the symbol waveform is based on one of an on-off keyed (OOK) format and a pulse position modulation (PPM) format.

5. The system of claim 1, wherein the demodulator determines a first logic state when the occurrence of the first state is determined at a first predetermined time interval of a given predetermined time period followed by the determination of the occurrence of the second state at a second predetermined time interval of the given predetermined time period, and the demodulator determines a second logic state when the occurrence of the second state is determined at the first predetermined time interval of the given predetermined time period followed by a determination of the occurrence of the first state at the second predetermined time interval of the given predetermined time period.

6. The system of claim 1, wherein the merged pulse count sampled by the demodulator associated with the first state is based both on a signal associated with light pulse energy transmitted from the transmitter and noise detected by the plurality of photon counting sensors and the merged pulse count sampled by the demodulator associated with the second state is based only on noise detected by the plurality of photon counting sensors.

7. The system of claim 1, further comprising:
a transmitter comprising:
a symbol mapper that accepts message data or waveforms and converts the message data or waveform into a symbol waveform; and
a modulator that controls the output of light pulse energy from an emitter to the receiver based on the symbol waveform.

8. An optical communication system comprising:
a transmitter comprising:
a symbol mapper that accepts message data or waveforms and converts the message data or waveform into a symbol waveform;
an emitter configured to transmit light pulses to a receiver; and
a modulator that controls the output of light pulse energy from the emitter based on the symbol waveform; and
a receiver comprising:
a plurality of photon counting sensors that each receive photons and generate pulses based on the received photons;
an electronic circuit that aggregates the number of pulses from the plurality of photon counting sensors into a merged pulse count; and
a demodulator configured to:
sample the merged pulse count at predetermined time intervals to determine a number of photons received by the plurality of photon counting sensors during different sampling time intervals;
determine, for each sampling time interval, an occurrence of a first state when light pulse energy has been transmitted by a transmitter and received by the plurality of photon counting sensors and an occurrence of a second state when light pulse energy has not been transmitted by the transmitter and received by the plurality of photon counting sensors;
decode a symbol waveform to recover message data or a waveform encoded in the symbol waveform that is based on a pattern of the occurrences of the first and second states over a plurality of predetermined time intervals, wherein the symbol waveform is based on a return to zero (RZ) format; and
compute a matched filter response from count values corresponding to the number of photons received by the plurality of photon sensors and use the shape of this response to provide feedback to one or more sampling event counters of the electronic circuit to synchronize a sampling of one or more sampling event counters of the electronic circuit to an incoming symbol waveform corresponding to a pattern of occurrences of the first and second states to maximize received signal energy counts from the one or more sampling event counters of the electronic circuit.

9. The system of claim 8, wherein the electronic circuit comprises:
a logical "OR" logic device that receives the pulses from each of the plurality of photon counting sensors and provides each of the received pulses at an output; and
the one or more sampling event counters that count the number of generated pulses provided at the output of the logical "OR" device and provides a merged pulse count in response to a sampling control signal.

10. The system of claim 8, wherein the one or more sampling event counters is a plurality of sampling event counters the electronic circuit comprises:
the plurality of sampling event counters, with each of the photon counting sensors having a respective sampling event counter that counts the number of generated pulses of its corresponding photon counting sensor; and
a summer that sums the count values that are provided from the plurality of sampling event counters in response to a common sampling control signal to provide a merged pulse count.

11. The system of claim 8, wherein the symbol waveform is based on an on-off keyed (OOK) format and a pulse position modulation (PPM) format.

12. The system of claim 8, wherein the demodulator determines a first logic state when the occurrence of the first state is determined at a first predetermined time interval of a given predetermined time period followed by the determination of the occurrence of the second state at a second predetermined time interval of the given predetermined time period, and the demodulator determines a second logic state when the occurrence of the second state is determined at the first predetermined time interval of the given predetermined time period followed by a determination of the occurrence of the first state at the second predetermined time interval of the given predetermined time period.

13. A method for communicating in an optical communication system, the method comprising:
receiving light energy at a plurality of photon counting sensors;
aggregating the number of pulses generated by the plurality of photon counting sensors into a merged pulse count;
sampling, by one or more sampling event counters, the merged pulse count at predetermined time intervals to determine a number of photons received by the plurality of photon counting sensors during different sampling time intervals; and determining and assigning, for each of the predetermined time intervals an on-state when a merged pulse count associated with a given time interval exceeds a predetermined threshold indicating the receipt of transmitted light pulse energy and assigning an off-state to a given time interval of the plurality of intervals indicating no receipt of transmitted light pulse energy;

decoding a symbol waveform to recover message data or a waveform encoded in the symbol waveform based on a pattern of the occurrences of the on and off-states over the plurality of predetermined time intervals, wherein the symbol waveform is based on a return to zero (RZ) format; and computing a matched filter response from count values counted by the one or more sampling event counters and employing the shape of this response to provide feedback to the one or more sampling event counters to synchronize the sampling to an incoming symbol waveform corresponding to a pattern of the on and off states to maximize received signal energy counts from the one or more sampling event counters.

14. The method of claim 13, further comprising converting message data or waveforms into the symbol waveform based on one of an on-off keyed (OOK) format; and modulating between transmitting light pulse energy and not transmitting light pulse energy based on the on and off-states of the symbol waveform.

15. The method of claim 13, further comprising determining a first logic state when the occurrence of the on-state is determined at a first predetermined time interval of a given predetermined time period followed by the determination of the occurrence of the off-state at a second predetermined time interval of the given predetermined time period, and the determining a second logic state when the occurrence of the off-state is determined at the first predetermined time interval of the given predetermined time period followed by a determination of the occurrence of the on-state at the second predetermined time interval of the given predetermined time period.

16. The method of claim 15, wherein the merged pulse count associated with the first state is based both on a signal associated with light pulse energy and noise and the merged pulse count of the photons associated with the second state is based only on noise.

* * * * *